United States Patent [19]
Zahn et al.

[11] 3,813,158
[45] May 28, 1974

[54] COLOR PRINTER USING LIGHT FLASH TUBES

[75] Inventors: Wolfgang Zahn; Berthold Fergg; Walter Knapp, all of Muenchen, Germany

[73] Assignee: Agfa-Gevaert Aktiengesellschaft, Leverkusen, Germany

[22] Filed: Sept. 29, 1971

[21] Appl. No.: 184,796

[30] Foreign Application Priority Data
Oct. 2, 1970 Germany.............................. 2048606

[52] U.S. Cl. ................................... 355/38, 355/68
[51] Int. Cl. .......................................... G03b 27/76
[58] Field of Search.......................... 355/38, 35, 68

[56] References Cited
UNITED STATES PATENTS

| | | | |
|---|---|---|---|
| 3,170,022 | 3/1965 | Ressen............................. | 355/38 X |
| 3,293,033 | 12/1966 | Maddock.......................... | 355/38 X |
| 3,350,603 | 10/1967 | Erickson..................... | 315/241 P X |
| 3,350,981 | 11/1967 | Neale............................... | 355/38 X |
| 3,495,903 | 2/1970 | Morley............................. | 355/4 X |
| 3,642,377 | 2/1972 | Young.............................. | 355/38 |
| 3,495,903 | 2/1970 | Morley............................. | 355/4 X |

FOREIGN PATENTS OR APPLICATIONS
38-19752  12/1963  Japan................................. 315/149

*Primary Examiner*—Richard M. Sheer
*Assistant Examiner*—Richard A. Wintercorn
*Attorney, Agent, or Firm*—Michael S. Striker

[57] ABSTRACT

The average color content over a plurality of negatives in each of three primary colors is measured prior to printing of any of these negatives. In case of excess of any color, subtractive filters are inserted in the light path between the flash gun and the original. The average density and density distribution of an individual negative is measured prior to printing and the total amount of light emitted by the flash gun controlled accordingly.

20 Claims, 3 Drawing Figures

PATENTED MAY 28 1974
3,813,158
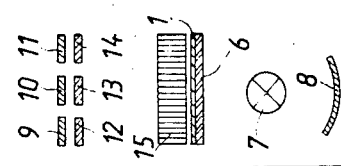
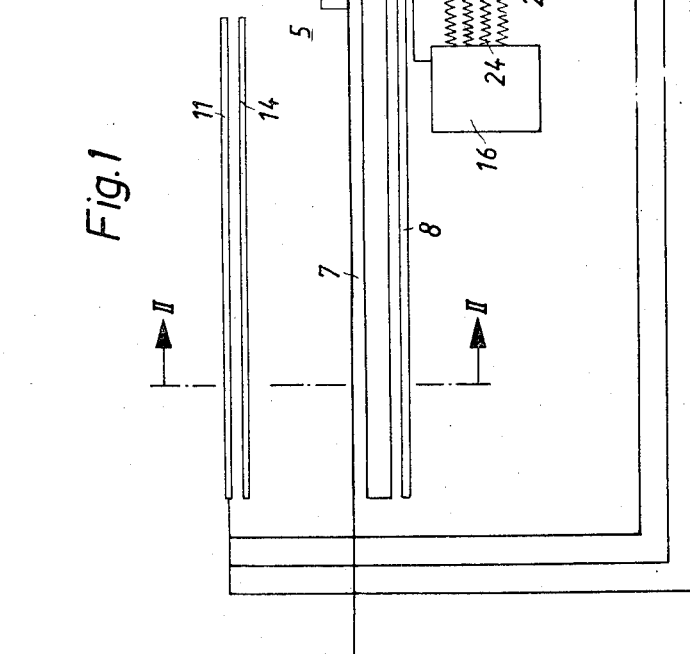
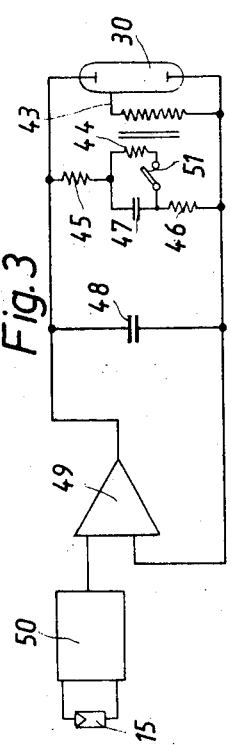
INVENTORS
WOLFGANG ZAHN
WALTER KNAPP
BERTHOLD FERGG
BY

COLOR PRINTER USING LIGHT FLASH TUBES

BACKGROUND OF THE INVENTION

This invention relates to photographic reproducing equipment furnishing color reproductions of originals. In particular, it relates to photographic printing apparatus furnishing color prints from negatives, where the negatives are on a film strip, the strip in turn comprising a number of individual strips glued together, each of the individual strips constituting a particular order sent in by a particular customer. Such photographic printing equipment comprises a light source and automatic control equipment for maintaining the total quantity of light impinging upon the reproducing material (printing paper) substantially constant.

As the output of the automatic printer increased, decreasing the time available for the printing of each picture, stronger and stronger light sources were required. The incandescent lamps first in use were replaced by halogen lamps which yield more light in the visible region. However, for all of these thermal light sources the originals are exposed to a great deal of heat and the printing apparatus itself also reached excessively high temperatures. A further increase in the processing speed of printers is thus impossible while using thermal light sources.

Light sources which furnish a great deal more light without the simultaneous generation of excessive heat are known. These are flash tubes, which furnish light flashes of high intensity lasting for a very short duration. The conventional method of inserting different subtractive filters into the path of the light during the exposure, to effect the correct exposure for each color, is thus not feasible when flash bulbs are used.

SUMMARY OF THE INVENTION

It is the object of the present invention to furnish photographic reproducing equipment making color reproductions and using a flash bulb as a light source.

This invention comprises a photographic arrangement for furnishing color reproductions of a plurality of originals. It comprises light flash means furnishing a light flash travelling along a predetermined path. An original and reproducing material are positioned along the predetermined path, the light flash creating a reproduction of the original on the reproducing material. First measuring means measure the proportion of total color content of at least a first and a second color in a determined plurality of originals, and furnish filter control signals as a function thereof. Color filter means are operable to tint the light of the flash in accordance with the filter control signals, thereby compensating for deviations of the proportions from predetermined proportions.

The equipment also has exposure control means which control the total quantity of light impinging on said original during the exposure. This control can be effected by either controlling the emission time of the light flash, or it can take place via a control of the total number of flashes in a flash sequence. The required color corrections are, as stated above, carried out by tinting the light of the flash during the exposure by the insertion of color filters prior to the exposure. In order to determine the amount of filtering required, the proportion of a given color is measured not in a single negative (original) but in a plurality of such originals, all associated with the same film. The reason a plurality of negatives and not a single negative is used to determined the average proportion of each of a number of colors, is that in a single negative one color may actually predominate because of the subject matter involved. If a standard neutral gray compensation is carried out on the basis of such a negative, color errors would actually be introduced. However, it is assumed that in a large number of negative the proportions of each color should average out. An excessive proportion of any one color throughout a plurality of negatives is thus taken to indicate an actual undesirable tint resulting for example from excessive storage, improper handling during developing, a ting in the emulsion, etc. Thus, measuring the proportions of the colors in a plurality of negatives results in greater assurance that within the negative being so evaluated, no single color actually dominates.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagram of the arrangement of the present invention;

FIG. 2 is a section along lines II—II of the arrangement of FIG. 1; and

FIG. 3 is a circuit diagram showing the regulation of the energy supply for a flash tube.

DESCRIPTIONS OF THE PREFERRED EMBODIMENT

A preferred embodiment of the present invention will now be described with particular reference to the drawing.

In FIG. 1 reference numeral 1 denotes a film band which comprises a plurality of film strips which have been pasted together, each of the film strips holding a plurality of originals, for example negatives. The film 1 is transported by transport means comprising a pair of rollers 2, 3, which are driven in synchronism with a similar pair of rollers which transport the reproducing material, for example printing paper. The latter is denoted by reference numeral 4 in FIG. 1.

The film is transported by the above-mentioned film transport means along a path including a measuring section denoted by reference numeral 5 in FIG. 1. Throughout this measuring section the film passes over a glass plate 6 underneath which a rod-like source of light, for example a fluorescent light, is positioned. The length of the fluorescent light is such that for example seven negatives of the 24 × 36 mm format are simultaneously illuminated. Arranged underneath fluorescent lamp 7 is a reflector 8.

Three elongated photoelements, respectively numbered 9, 10 and 11, are arranged above film 1 at such a distance that possible differences in color distribution within the negatives do not effect the overall result. Just prior to each photoelement in the path of the light emanating from light source 7 is an additive color filter (12, 13 and 14, respectively). Thus, each of the photoelements 9, 10 and 11 receives light only in one of the additive primary colors. The measured value in each color is representative for the proportion of this color taken over the seven originals.

In the embodiment of FIG. 1, it is assumed that the first transport means transports the film in such a manner that each transport step causes a new negative to be positioned at the printing location. In FIG. 1, the first measuring location covers the first seven negatives. Immediately following the first measuring location is a second measuring location wherein are located photoelectric means 15 which constitute part of the exposure control means. The photoelectric means 15 may comprise, for example, forty-nine photoelectric elements equally sensitive to all three of the additive primary colors. The output signals of these photoelectric elements may be used, in accordance with the system taught in U.S. patent application, Ser. No. 89 357 to generate a signal corresponding to the density distribution within the negative. This value in turn is used to effect a correction in exposure time relative to the value corresponding to the average density of the negative. Simultaneously, the arrangement 15, with photoelements connected in parallel, may be used to furnish a signal signifying the average density of the original. This average density signal is applied to a comparator 16 which compares said average density signal to a first, second, third and fourth comparison signal. Each of the comparison signals are indicative of predetermined density values. For example, the first and second comparison signals indicate a minimum and maximum density, respectively, this indicating a greatly under- and over-exposed negative, respectively. The third and fourth comparison signals may correspond to density values associated with negatives which are slightly over- or under-exposed, respectively. Since it has been found that given amounts of over- or underexposure of a color negative result in particular tinting of the print, the arrangement shown in FIG. 1 provides for four compensation filters, numbered 18, 19, 20 and 21, which may be alternatively introduced into the path of light from the flash gun during the printing process in order to compensate for such tinting. The filters are movable by means of electromagnets 23-25, each of which moves particular filter into the light path under control of the comparator means 16. Since different films and printing paper require different filters for the above-described compensation, the basic assumption underlying the equipment shown in FIG. 1 is that the same type of film and printing paper is used for a sufficiently long time that the time and effort required in a change of filters is reasonable.

The average density signal furnished by arrangement 15 is also used, in one embodiment of the present invention shown in FIG. 3, to determine the amount of light furnished by a flash tube 30. This will be discussed in connection with FIG. 3.

The transport means then move the negative into the printing position 17. Here the film is illuminated by the flash from the flash tube 30 and guided to the printing location through guide means 26. Light guiding means 26 comprise a horizontally mounted hollow shaft 27 which has internal mirrored surfaces and a vertical hollow shaft 28 which also has internal mirrored surfaces. A deflecting mirror 29 connects the two shafts. Mirror 29 is located at the junction of the two shafts at an angle of 45°. Light flash means, namely a flash tube 30, is positioned at the input side of shaft 27. Reflector 31 is mounted on the opposite side of flash tube 30 relative to the input side of shaft 27. Thus, the light falling on the side opposite shaft 27 is reflected back into said shaft.

The above-described light guiding means and reflector 31 may also be replaced by a pyramid-shaped reflector with a rod-like flash tube mounted in the axis of the pyramid, in accordance with German Gebrauchsmuster 7,021,913.

Filters 18, 19, 20 and 21 are arranged for insertion into the path of light from the flash tube in the vertical shaft 28. They can of course be arranged anywhere else in the path of the light. Arranged for insertion into the light path during the horizontal portion thereof are filters 36, 37 and 38, which are the color filters which compensate for possible excessive proportions of one of the primary additive colors in the plurality of negatives, as described above. In particular, the first, second and third color signals furnished by photoelements 9, 10 and 11 are applied to a computing means 42 which computes therefrom the first, second and third filter control signals. These filter control signals are in turn applied to a first, second and third servomotor denoted by reference numerals 39, 40 and 41 respectively. Each of these servomotors moves a corresponding one of the color filters 36-38 into the path of the light from flash tube 30 for a distance corresponding to the filter control signal applied to said servomotor. Color filters 36, 37 and 38 are maximum density subtractive filters respectively filtering only the color red, blue, and green.

When the original after the above-described measurements arrives at the printing station 17, the filters have been inserted into the path. It is still required, however, to regulate the total quantity of light impinging upon the printing paper during the printing of the negative. Many known arrangements accomplish this goal. One of these is illustrated in FIG. 1, while, as mentioned above, a second is illustrated in FIG. 3. In the arrangement of FIG. 1, the light from the light flash after passing through the film is focussed via an objective 34 onto a partially transmissive mirror 35. The light transmitted through mirror 35 impinges upon printing paper 4, while the light reflected impinges upon a photoelectric transducer 33. This photoelectric transducer is preferably a secondary electron multiplier, since its response time must be rapid due to the short duration of the flash. The output signal from the photoelectric transducer 33 is integrated in an arrangement which is not shown in FIG. 1 and the so integrated signal is used to determine the firing point of a quench tube (also not illustrated) whose firing terminates the flash of the flash tube. Such a system is described in the Edgerton patent, U.S. Pat. No. 3,033,988 and will not be further described here.

The signal furnished by phototransducer means 33 may also be used in another embodiment of a circuit for controlling the total quantity of light impinging upon the reproducing material. In this particular embodiment the flash tube furnishes a flash sequence of at least several hundred but possibly even more than a thousand flashes per second. These flashes may be individually activated by means of a corresponding activation circuit. The signal furnished by photocell 33, again after integration, may then be used to impede the generation of further flashes when the so integrated signal has reached some predetermined value. In this particular method the energy loss consumed by the quench tube is avoided, while the direct measurement of the light impinging upon the printing material gives an optimum exposure control. When a flash tube furnishing a sequence of flashes per exposure is used, it is also possible to dispense with the secondary electron multiplier 33 and to terminate the flash sequence on the basis of a signal dependent upon the average density signal furnished by arrangement 15.

Still another possibility for controlling the light impinging upon the printing material is shown in FIG. 3. FIG. 3 shows the flash tube 30 having two main electrodes and a control electrode labelled 43. The main energy for the flash is furnished by a capacitor 48 connected in parallel with the main electrode of flash tube 30, while the start of the flash is determined by the application of a signal to control electrode 43. The signal to control electrode 43 is furnished via a transformer having a secondary connected from said control electrode to ground and a primary connected in an ignition circuit which comprises a capacitor 47 connected in parallel with primary winding of transformer 44. Interconnected between capacitor 47 and the primary winding of transformer 44 is a switch 51. The common point of capacitor 47 and primary winding of transformer 44 is connected to one side of capacitor 48 via a resistance 45, while the common point of capacitor 47 and switch 51 is connected to ground via resistance 46. Prior to the ignition the main supply capacitor 48 is charged to a voltage which determines the total amount of energy available for flash tube 30. Also prior to ignition, switch 51 is opened causing capacitor 47 to charge through resistances 45 and 46. When ignition is desired switch 51 is closed causing a pulse to be applied to control electrode 43 through the discharge of capacitor 47 through the primary of transformer 44. The amount of energy available for a flash is determined by the charge on capacitor 48 and therefore by the output of an operational amplifier 49, which may be a differential amplifier. The output of operational amplifier 49 to which capacitor 48 is connected is, in turn, determined by the signal at its output. As illustrated in FIG. 3, the signal at the input of differential amplifier 49 is determined by the average density signal furnished by scanning means 15 after suitable processing to take into account the presence of the filters in the path of the light. Thus, the circuit symbolized by block 50 may comprise a number of variable resistors each having a movable arm whose movement is controlled each by one of the servo-motors 39–41. The resistances of these variable resistors thus vary as a function of the postiion of filters 36–38 in the path of the light. In order to compensate for the absence or presence of filters 18–20, each of these filters may, for example, be mechanically coupled to a shunt which shunts a determined resistor when the filter is in the path of the light and removes said shunt when the filter moves out of the path of the light. Thus the signal at the input of amplifier 49 is an average density signal with additional compensation to take into account the decrease in light impinging upon the printing material because of the presence of various filters in the path of the light. Of course, such a presetting of the available energy for the flash prior to the emission of the flash does not result in as exact a control of the amount of light actually impinging upon the printing paper as does a circuit described above wherein the actual amount of light impinging upon the printing material is actually measured through use of the photomultiplier 33.

The above-described arrangement operates as follows:

First, when a new film strip is introduced into the measuring location 5, the relationship of the three primary colors to one another on the average, in all of the negatives at the measuring station is first determined. If, for example, one of the three primary colors dominates, the corresponding subtractive filter of filters 36, 37 and 38, which subtracts only this particular color is moved further into the path of the light than are the other two filters, thereby compensating for the previously determined excess in said color.

As a given negative is then advanced into the second measuring location, the scanning arrangement 15 is used in conjunction with comparator 16 to determine whether the particular negative to be printed next is either over- or under-exposed and to what extent. In accordance with the output signal of comparator 16, if the negative is not properly exposed, one of the filters 18–21 is positioned in the path of the light in order to compensate for the tint which would otherwise result from the particular exposure error. In the absence of a direct measurement of the light impinging upon the printing paper, that is in the absence of secondary electron multiplier 33 and its associated circuitry, the average density signal furnished by scanning means 5 is also used to determine the total energy which will be available for the flash when a print is made corresponding to the negative presently being measured.

After the density measurement has been completed and the corresponding filter has been inserted into the path of the light, the negative is advanced to the printing station. Simultaneously therewith the printing paper is advanced. The printing is then carried out by initiating either the single flash or the flash sequence. The printing process is completed when the flash has been terminated either through the ignition of the quench tube if the Edgerton type of circuit is used or by the lack of charge on capacitor 48 if the preset system of FIG. 3 is used.

The actual illumination time, or the time required for the actual printing process is only in the order of several milliseconds. The time required for printing a number of negatives thus depends mostly upon the time required to transport the film and the printing paper and the time required for insertion of the filters into the path of the light from the flash tube. Using as a basis the presently attainable times required for these mechanical steps, a printer using the arrangement of the present invention requires approximately 0.25 seconds for furnishing a reproduction. Further, the processing time per negative required by the equipment of the present invention may be varied over wide ranges by corresponding regulation of the velocity of the transport means transporting the film and the printing paper. This ease of varying the processing time is a great advantage when the equipment of the present invention is used in conjunction with developing equipment. This is because a buffer between the printing arrangement of the present invention and the developer has a limited capacity. Thus, after the paper and film rolls in the printer have been changed, the printer must operate at a higher velocity in order to eliminate the negatives which have accumulated in the buffer.

It will be noted that in the above-described arrangement filters 36–38 are not repositioned for each negative but are only repositioned when all negatives whose measurement entered into the original positioning of these filters have been printed.

In case the beginning of a new film is encompassed in measuring station 5, it is possible to process only the negatives of the last film in accordance with the filter setting. When the first print pertaining to the next film strip is in the last position prior to entering the second measuring location, the filter settings can then be readjusted in accordance with filter signals furnished by measuring the density of a plurality of negatives pertaining to the subsequent film strip.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Photographic arrangement for furnishing color reproductions of a plurality of originals, comprising, in combination, first measuring means measuring the proportion of total color content of at least a first and second color in said plurality of originals and furnishing filter control signals as a function thereof; color filter means operable to tint light travelling along a predetermined light path in accordance with said filter control signals, thereby compensating for deviations of said proportions from predetermined proportions; light flash means furnishing, upon ignition, a light flash travelling along said predetermined light path; a selected one of said originals positioned along said predetermined light path; and reproducing material positioned along said predetermined light path, said light flash creating thereon a reproduction of said selected one of said originals.

2. An arrangement as set forth in claim 1, further comprising exposure control means for limiting the total quantity of light falling on said reproducing material during an exposure.

3. An arrangement as set forth in claim 2, wherein said exposure control means comprise photoelectric means mounted to receive light corresponding to the light falling on said reproducing material and furnishing an exposure signal as a function thereof; wherein said light flash means comprise a flash tube; further comprising quench tube means connected in parallel with said flash tube, for terminating said light flash when said exposure signal signifies a quantity of light exceeding a predetermined light quantity.

4. An arrangement as set forth in claim 3, wherein said photoelectric means comprise secondary electron multiplier means.

5. An arrangement as set forth in claim 1, further comprising second measuring means for measuring the density of said selected one of said plurality of originals and furnishing a density signal corresponding thereto; wherein said light flash means for comprise a light flash tube; further comprising means for regulating the light emitted by said light flash tube as a function of said density signal.

6. An arrangement as set forth in claim 5, wherein said second measuring means comprise average density measuring means for measuring the average density of said selected one of said originals and furnishing an average density signal corresponding thereto.

7. An arrangement as set forth in claim 1, wherein said first measuring means comprise first light source means simultaneously illuminating said plurality of originals; photoelectric receiving means receiving light transmitted through said plurality of originals in a first, second and third color, respectively, and furnishing corresponding first, second and third color signals; computing means furnishing a first, second and third filter control signal as a function of said first, second and third color signals; wherein said color filter means comprises a first, second and third color filter, and moving means for moving said first, second and third color filter into said predetermined light path in response to said first, second and third filter control signal, respectively.

8. Photographic arrangement for furnishing color reproductions of a plurality of originals, comprising, in combination, light flash means furnishing a light flash travelling along a predetermined light path; an original positioned along said predetermined light path; reproducing material positioned along said predetermined light path, said light flash creating thereon a reproduction of said original; first measuring means measuring the proportion of total color content of a first, second and third color in said determined plurality of originals, said first measuring means comprising first light source means simultaneously illuminating said plurality of originals, photoelectric receiving means receiving light transmitted through said plurality of originals in said first, second and third color, respectively, and furnishing corresponding first, second and third color signals, computing means furnishing a first, second and third filter control signal as a function of said first, second and third color signal, respectively; and color filter means operable to tint the light of said light flash in accordance with said filter control signals, thereby compensating for deviations of said proportions from predetermined proportions.

9. Photographic arrangement for furnishing color reproductions of a plurality of originals, comprising, in combination, first measuring means for measuring the proportion of total color content of at least a first and second color in said plurality of originals and furnishing filter control signals as a function thereof; color filter means operable to tint light travelling along a predetermined light path in accordance with said filter control signals, thereby compensating for deviations of said proportions from predetermined proportions; light flash means for furnishing, upon ignition, a light flash travelling along said predetermined light path; a selected one of said originals positioned along said predetermined light path; reproducing material positioned along said predetermined light path, said light flash creating thereon a reproduction of said selected one of said originals; second measuring means for measuring the density of said selected one of said plurality of originals and furnishing a density signal corresponding thereto; means connected to said light flash means for regulating the light emitted by said light flash means as a function of said density signal; and wherein said second measuring means comprise average density measuring means for measuring the average density of said selected one of said originals and furnishing an average density signal corresponding thereto, comparing means for comparing said average density signal to a first and second comparison signal respectively signifying a predetermined minimum and maximum density and furnishing a first and second comparator signal when said average density signal indicates a density less than said first or greater than said second comparison signal respectively, first and second additional filter means, and means for moving said first and second additional filter means into said predetermined path of said light flash in response to said first and second comparator signal, respectively.

10. An arrangement as set forth in claim 9, wherein said comparing means further compares said average density signal to a third and fourth comparison signal indicative, respectively, of a density intermediate between an acceptable density and said minimum and maximum densities, and furnishing a third and fourth comparator signal when said average density signal exceeds said third and fourth comparison signals respectively; further comprising third and fourth additional filter means; and means moving said third and fourth additional filter means, respectively, into said predetermined light path of said light flash, in response to said third and fourth comparator signals.

11. Photographic arrangement for furnishing color reproductions of a plurality of originals, comprising, in combination, first measuring means for measuring the proportion of total color content of at least a first and second color in said plurality of originals and furnishing filter control signals as a function thereof, said first measuring means comprising first light source means for simultaneously illuminating said plurality of originals, photoelectric receiving means for receiving light transmitted through said plurality of originals in a first, second and third color, respectively, and furnishing corresponding first, second and third color signals; computing means for furnishing a first, second and third filter control signal as a function of said first, second and third color signals; color filter means operable to tint light travelling along a predetermined light path in accordance with said filter control signals, thereby compensating for deviations of said proportions from predetermined proportions, said color filter means comprising a first, second and third color filter, and moving means for moving said first, second and third color filter into said predetermined light path in response to said first, second and third filter control signal, respectively, said moving means comprising a first, second and third servomotor, each of said servomotors moving the corresponding color filter a distance into said predetermined path of said light corresponding to the amplitude of the respective filter control signal; light flash means for furnishing, upon ignition, a light flash travelling along said predetermined light path; a selected one of said originals positioned along said predetermined light path; and reproducing material positioned along said predetermined light path, said light flash creating thereon a reproduction of said selected one of said originals.

12. An arrangement as set forth in claim 11, wherein said photoelectric receiving means comprise a first, second and third photoelectric receiving element; and first, second and third additive filter means, each positioned in the path of said light from said first light source means, between all of said plurality of originals and the corresponding one of said photoelectric receiving means.

13. An arrangement as set forth in claim 12, further comprising light guiding means for guiding the light from said flash means along said predetermined light path to said printing location; first transport means transporting said plurality of originals along a predetermined transport path to said printing location; second transport means operated in synchronism with said first transport means for transporting said reproducing material along a second predetermined path to said printing location; and means stopping said transport means when one of said originals is at said printing location.

14. An arrangement as set forth in claim 13, wherein said first measuring means are located at a measuring location preceding said printing location along said predetermined transport and second paths.

15. An arrangement as set forth in claim 14, further comprising means impeding the operation of said first, second and third servomotor following receipt of said first, second and third filter control signals until completion of the reproduction of all originals in said determined plurality of originals.

16. An arrangement as set forth in claim 13, wherein said light guiding means comprise hollow shaft means having internal mirrored surfaces.

17. An arrangement as set forth in claim 5, further comprising means furnishing a density reference signal; wherein said means for regulating said light emitted by said light flash tube comprise amplifier means connected to said second measuring means and said means furnishing a density reference signal, said amplifier means furnishing an amplifier output signal corresponding to the difference between said density reference signal and said average density signal; and capacitor means connected to the output of said amplifier means and connected to said light flash tube, said capacitor means furnishing energy to said light flash tube in dependence upon said amplifier output signal.

18. An arrangement as set forth in claim 17, wherein said means furnishing a density reference signal comprise circuit means having variable resistance means; and means connected to said first, second and third servomotor for varying the resistance of said variable resistance means.

19. An arrangement as set forth in claim 6, wherein said light flash tube comprises a light flash tube adapted to fire at least one hundred flashes per second, and wherein said means for regulating said light emitted by said light flash tube comprise means for controlling the number of flashes during an exposure as a function of said average denstiy signal.

20. An arrangement as set forth in claim 19, wherein said light flash tube emits a sequence of light flashes at a rate of at least one thousand flashes per second.

* * * * *